United States Patent
Kwon et al.

(10) Patent No.: US 10,778,300 B2
(45) Date of Patent: Sep. 15, 2020

(54) METHOD AND APPARATUS FOR HIGH RANK MULTIPLE-INPUT MULTIPLE-OUTPUT (MIMO) SYMBOL DETECTION

(71) Applicant: Samsung Electronics Co., Ltd., Gyeonggi-do (KR)

(72) Inventors: Hyukjoon Kwon, San Diego, CA (US); Xiaoqiang Ma, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 16/273,632

(22) Filed: Feb. 12, 2019

(65) Prior Publication Data

US 2020/0177248 A1  Jun. 4, 2020

Related U.S. Application Data

(60) Provisional application No. 62/774,554, filed on Dec. 3, 2018.

(51) Int. Cl.
*H04B 7/0456* (2017.01)
*H04B 7/08* (2006.01)
*H04L 1/00* (2006.01)

(52) U.S. Cl.
CPC ......... *H04B 7/0486* (2013.01); *H04B 7/0854* (2013.01); *H04L 1/0047* (2013.01); *H04L 1/0091* (2013.01); *H04L 2201/04* (2013.01)

(58) Field of Classification Search
None
See application file for complete search history.

(56) References Cited

U.S. PATENT DOCUMENTS

| | | | |
|---|---|---|---|
| 8,107,563 B2 * | 1/2012 | Yoon | H04B 7/0851 375/260 |
| 8,467,466 B2 | 6/2013 | Bjerke et al. | |
| 9,048,975 B2 | 6/2015 | Koo et al. | |
| 9,225,468 B1 * | 12/2015 | Sun | H04L 1/0048 |
| 9,647,732 B2 | 5/2017 | Zhou et al. | |
| 9,768,844 B2 | 9/2017 | Seifert et al. | |
| 2003/0186650 A1 * | 10/2003 | Liu | H04B 7/0842 455/25 |
| 2006/0210070 A1 * | 9/2006 | Reznik | H04L 25/03343 380/33 |
| 2007/0041464 A1 * | 2/2007 | Kim | H04L 1/06 375/267 |

(Continued)

FOREIGN PATENT DOCUMENTS

KR  1020180072311  6/2018

*Primary Examiner* — Shripal K Khajuria
(74) *Attorney, Agent, or Firm* — The Farrell Law Firm, P.C.

(57) ABSTRACT

A method and an apparatus in a multiple-input multiple-output (MIMO) wireless communication system are provided. A signal is received over a channel. The channel is decomposed into a plurality of virtual channels. Symbol detection is performed on each of the plurality of virtual channels using respective symbol detectors. At least one of the symbol detectors has a lower rank than that of the channel. Output from the symbol detectors is combined to obtain final log likelihood ration (LLR) values for layers of the channel. Decoding is performed using the final LLR values to output a decoded symbol value of the received signal.

20 Claims, 5 Drawing Sheets

(56) References Cited

U.S. PATENT DOCUMENTS

| | | | |
|---|---|---|---|
| 2007/0216545 A1* | 9/2007 | Li | H03M 7/30 341/50 |
| 2008/0089458 A1* | 4/2008 | Wallace | H04L 27/2657 375/371 |
| 2008/0152032 A1* | 6/2008 | Lee | H04L 25/067 375/260 |
| 2010/0183028 A1* | 7/2010 | Howard | G06F 8/45 370/468 |
| 2010/0296591 A1* | 11/2010 | Xu | H04W 52/16 375/259 |
| 2012/0064825 A1* | 3/2012 | Landon | H04B 7/10 455/39 |
| 2015/0087237 A1* | 3/2015 | Shang | H04B 1/1027 455/63.1 |
| 2015/0341143 A1 | 11/2015 | Wan et al. | |
| 2016/0278102 A1* | 9/2016 | Bontu | H04L 1/20 |
| 2018/0227020 A1 | 8/2018 | Ahn et al. | |
| 2018/0287822 A1* | 10/2018 | Wang | H04L 25/0224 |
| 2018/0294997 A1* | 10/2018 | Lee | H04W 24/08 |
| 2018/0309598 A1* | 10/2018 | Pena Campos | H04L 25/0224 |

* cited by examiner

METHOD AND APPARATUS FOR HIGH RANK MULTIPLE-INPUT MULTIPLE-OUTPUT (MIMO) SYMBOL DETECTION

PRIORITY

This application is based on and claims priority under 35 U.S.C. § 119(e) to a U.S. Provisional Patent Application filed on Dec. 3, 2018 in the United States Patent and Trademark Office and assigned Ser. No. 62/774,554, the contents of which are incorporated herein by reference.

FIELD

The present disclosure relates generally to a wireless communication system, and more particularly, to a method and an apparatus for high rank multiple-input multiple-output (MIMO) symbol detection.

BACKGROUND

A typical modem of an electronic device includes a symbol detector for determining log-likelihood-ratio (LLR) values of coded bits from received signals. These LLR values are used by a decoder of the modem to recover uncoded bits. When the number of layers (i.e., the rank) used for multiple-input multiple-output (MIMO) transmission increases, the complexity of symbol detection may increase significantly. In long term evolution (LTE) (Release 10) and fifth generation (5G) (Release 15), a maximum of eight transmit and eight receive antennas or panels are supported. Accordingly, 8×8 or rank-8 symbol detectors are required.

Existing MIMO symbol detectors include, for example, maximum likelihood (ML), zero-forcing (ZF), minimum mean square error (MMSE), ZF/MMSE-successive interference cancelation (MMSE-SIC), and sphere decoder (SD) detectors. For high rank scenarios, such as rank-8, existing linear symbol detectors, such as, for example, ZF and MMSE detectors, have degraded performance due to their simple architecture. Existing non-linear symbol detectors, such as, for example, ML, ZF/MMSE-SIC, and SD detectors, may perform well but are too complex to be implemented. For example, ML detection requires that all symbols in a constellation are considered for LLR value calculation.

SUMMARY

According to one embodiment, a method of operating an electronic device in a MIMO wireless communication system is provided. A signal is received over a channel. The channel is decomposed into a plurality of virtual channels. Symbol detection is performed on each of the plurality of virtual channels using respective symbol detectors. At least one of the symbol detectors has a lower rank than that of the channel. Output from the symbol detectors is combined to obtain final LLR values for layers of the channel. Decoding is performed using the final LLR values to output a decoded symbol value of the received signal.

According to one embodiment, an electronic device is provided. The electronic device includes a processor and a non-transitory computer readable storage medium storing instructions that, when executed, cause the processor to receive a signal over a channel, decompose the channel into a plurality of virtual channels, and perform symbol detection on each of the plurality of virtual channels using respective symbol detectors. At least one of the symbol detectors has a lower rank than that of the channel. The instructions, when executed, also cause the processor to combine output from the symbol detectors to obtain final LLR values for layers of the channel, and perform decoding using the final LLR values to output a decoded symbol value of the received signal.

According to one embodiment, a multiple-input multiple-output symbol detector of an electronic device is provided. The detector includes one or more preprocessors configured to decompose a channel, over which a signal is received, into a plurality of virtual channels. The detector also includes a plurality of symbol detectors configured to perform symbol detection on each of the plurality of virtual channels. At least one of the plurality of symbol detectors has a lower rank than that of the channel. Additionally, the detector includes a combiner configured to combine output from the symbol detectors to obtain LLR values for layers of the channel. The detector further includes a decoder configured to decode the final LLR values and output a decoded symbol value of the received signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
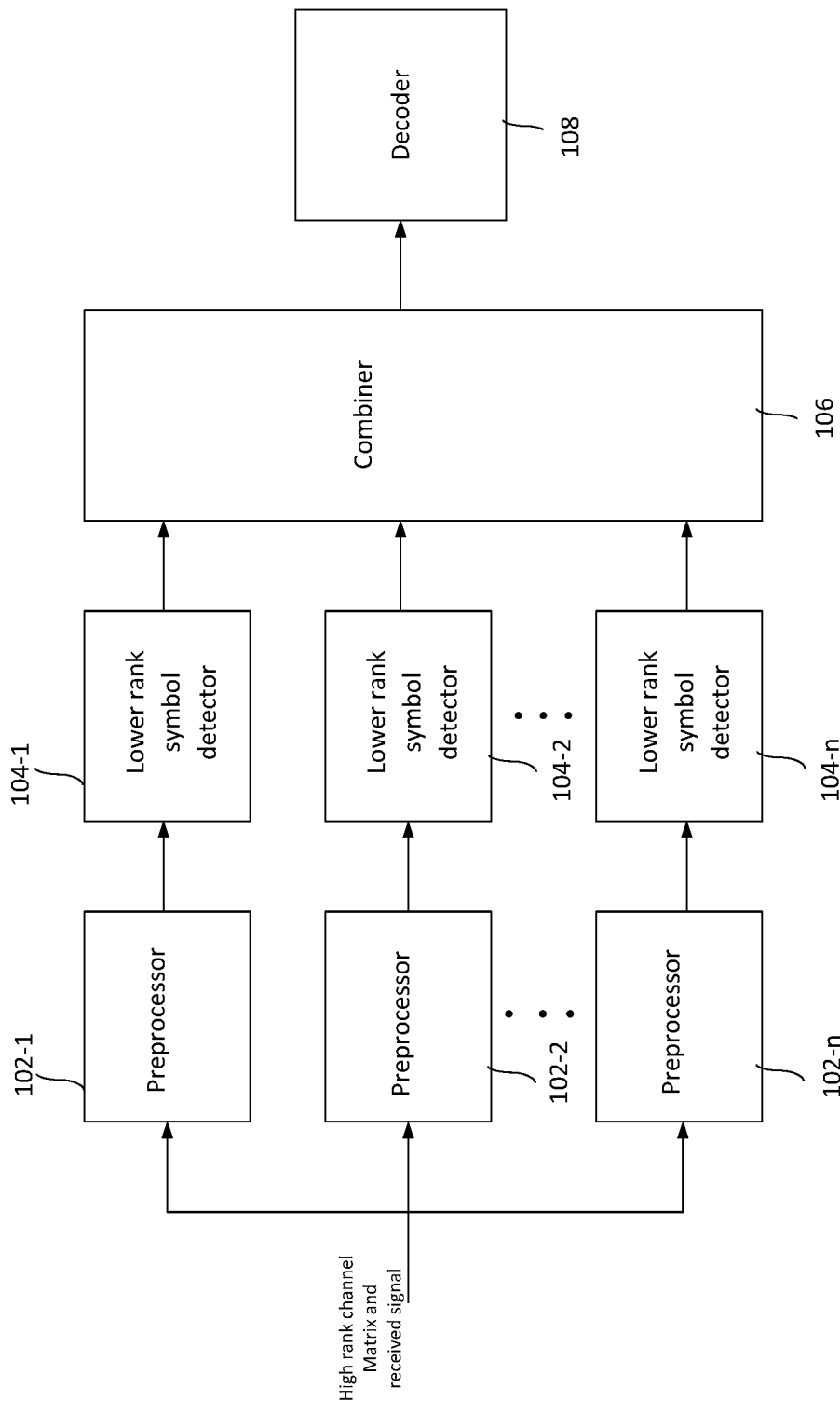
FIG. 1 is a diagram illustrating a high rank symbol detector implemented with multiple lower rank symbol detectors, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to embodiments of the present disclosure, virtual channel combining (VCC) is performed using several lower rank symbol detectors, and resulting Euclidean distance (ED) values or LLR values are combined, to fulfill the need for a high rank symbol detector. VCC introduces another form of diversity gain in forming multiple virtual channels, by preprocessing different selected layers of a channel over which a signal is received, for each virtual channel. Accordingly, low complexity and high flexibility are achieved for a high rank MIMO receiver. The system may utilize any type of symbol detector, having any rank at or below that of the channel, in any combination. For example, a rank-8 symbol detector can be implemented with 2 or more rank-4 symbol detectors. Alternatively, a rank-8 symbol detector can be implemented with 4 or more rank-2 symbol detectors.

FIG. 1 is a diagram illustrating a high rank symbol detector implemented with multiple lower rank symbol detectors, according to one embodiment. Given a signal received over a high rank channel, preprocessing is performed at preprocessors 102-1, 102-2, through 102-$n$ to decompose the high rank channel into several virtual channels with lower ranks. One example of a signal preprocessing scheme is interference whitening (IW). Other preprocessing schemes include, for example, interference cancellation, interference ignorance, and block based IW. The layers of the original high rank channel that remain in each virtual channel after signal preprocessing are referred to as detection layers, which are provided from each of preprocessors 102-1, 102-2, through 102-$n$ to respective lower rank symbol detectors 104-1, 104-2, through 104-$n$. Lower rank symbol detection is then performed on the corresponding detection layers. The outputs of the lower rank symbol detectors 104-1, 104-2, through 104-$n$ are ED values or LLR values for the detection layers. An ED value combining scheme or an LLR value combining scheme is performed at a combiner 106 to obtain final LLR values, corresponding to layers of the channel. A decoder 108 uses the final LLR values to obtain a decoded symbol value for the received signal.

Several ED or LLR combining schemes are described in greater detail below. However, embodiments of the present disclosure are not restricted to LLR combining schemes and ED combining schemes.

One such LLR combining scheme is LLR summation in which several corresponding bit LLR values for different lower rank symbol detectors are summed to obtain the final LLR for that specific bit. Another LLR combining scheme is LLR mean in which several corresponding bit LLR values for different lower rank symbol detectors are used to calculate its mean to obtain the final LLR value for that specific bit. Different mean calculation schemes can be applied, such as, for example, algebraic and geometric means. An additional LLR combining scheme is LLR selection in which, among several corresponding bit LLR values for different lower rank symbol detectors, only one LLR is selected to obtain the final LLR for that specific bit. The LLR with the largest absolute value is usually selected. However, other selection schemes may also be applied.

In ED combining, final EDs of 0 and 1 of each bit position of a modulation symbol are determined by the minimum corresponding EDs from different lower rank symbol detectors. Final LLR=minED(1)−minED(0), where minED(1) and minED(0) are final minimum ED of bit 1 and bit 0 of a specific bit position of a specific modulation symbol.

Figure 2:
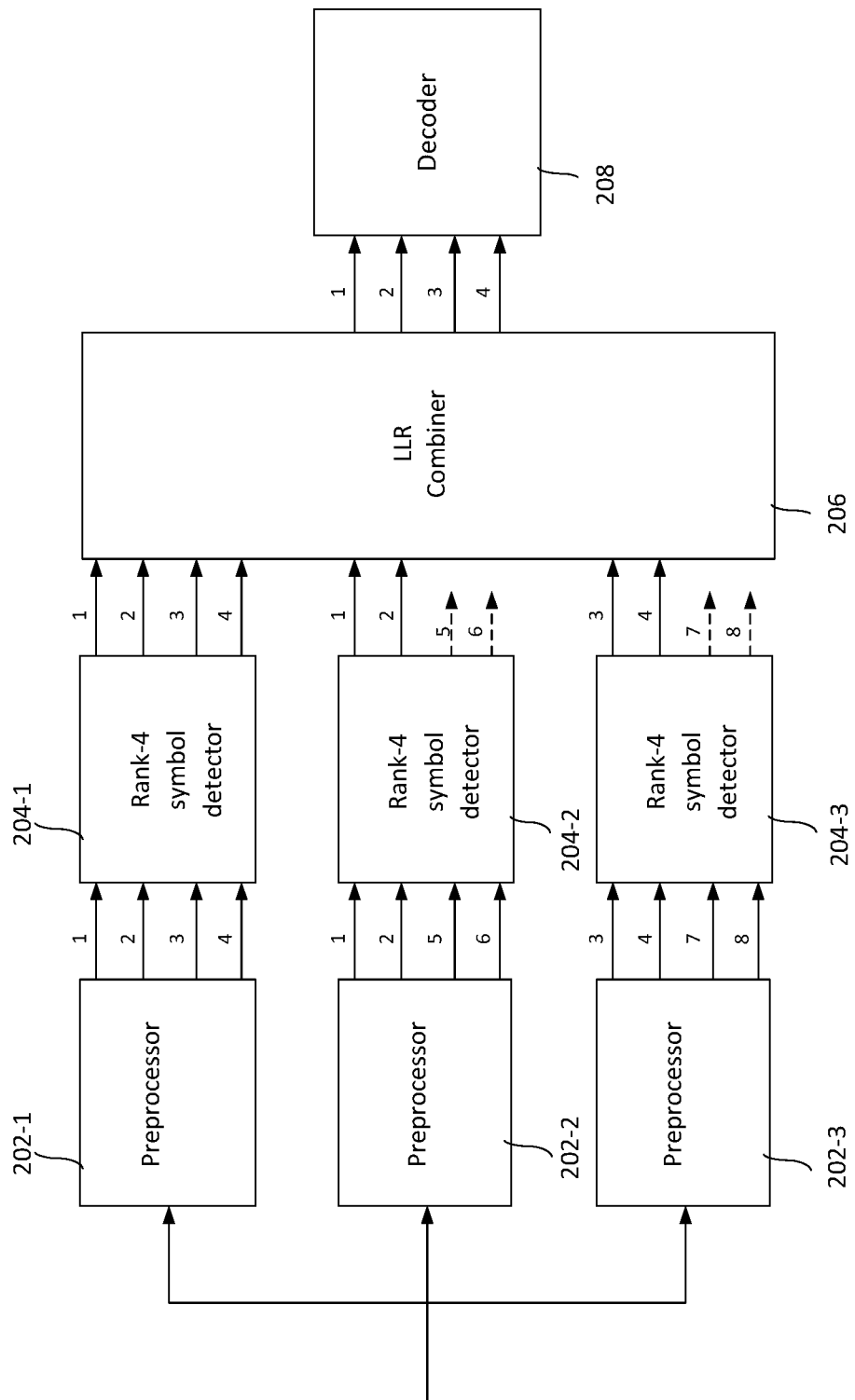
FIG. 2 is a diagram illustrating a rank-8 symbol detector implemented using three rank-4 symbol detectors, according to one embodiment.

Referring now to FIG. 2, a diagram illustrates a rank-8 symbol detector implemented using three rank-4 symbol detectors, according to one embodiment.

A rank-8 channel includes a first codeword (CW0), corresponding to layers 1-4 of the channel, and a second codeword (CW1), corresponding to layers 5-8 of the channel. FIG. 2 illustrates the processing of CW0, corresponding to layers 1-4 of the channel. Using IW as a preprocessing scheme, multiple virtual channels are generated at preprocessors 202-1, 202-2, and 202-3. For example, at first preprocessor 202-1, IW is performed on layers [5 6 7 8], resulting in detection layers [1, 2, 3, 4]. At second preprocessor 202-2, IW is performed on layers [3, 4, 7, 8], resulting in detection layers [1, 2, 5, 6]. At third preprocessor 202-3, IW is performed on layers [1, 2, 5, 6], resulting in detection layers [3, 4, 7, 8].

Each virtual channel is provided to a rank-4 symbol detector. For example, symbol detection is performed on detection layers [1, 2, 3, 4] at first rank-4 symbol detector 204-1. Symbol detection is performed on detection layers [1, 2, 5, 6] at second rank-4 symbol detector 204-2. Symbol detection is performed on detection layers [3, 4, 7, 8] at third rank-4 symbol detector 204-3. First through third rank-4 symbol detectors 204-1, 204-2, and 204-3 generate LLR values (or ED values) for the layers of CW0 (e.g., [1, 2, 3, 4], [1, 2], and [3, 4]).

The LLR values (or ED values) are combined at a combiner 206 using an LLR combining scheme (or ED combining scheme), and the resulting final LLR values are fed from the combiner 206 to a decoder 208 to provide a decoded symbol value of the received signal. Using more virtual channels helps to further improve performance.

Second rank-4 symbol detector 204-2 and third rank-4 symbol detector 204-3 have byproduct LLR values for layers [5, 6] and [7, 8] of the channel, respectively. Although these LLR values are not useful in decoding CW0, they may be saved and used in the subsequent decoding of CW1.

The ranks of the lower rank symbol detectors and the layers for preprocessing may be selected in various ways, such as, for example, fixed selection based on experience or simulation results, and dynamic selection based on metrics (e.g., power of preprocessed layers) or prior knowledge of channel profiles.

The ranks of the lower rank symbol detectors are not required to be the same. Furthermore, the ranks of some lower rank symbol detectors are not necessarily smaller than the rank of the channel.

Figure 3:
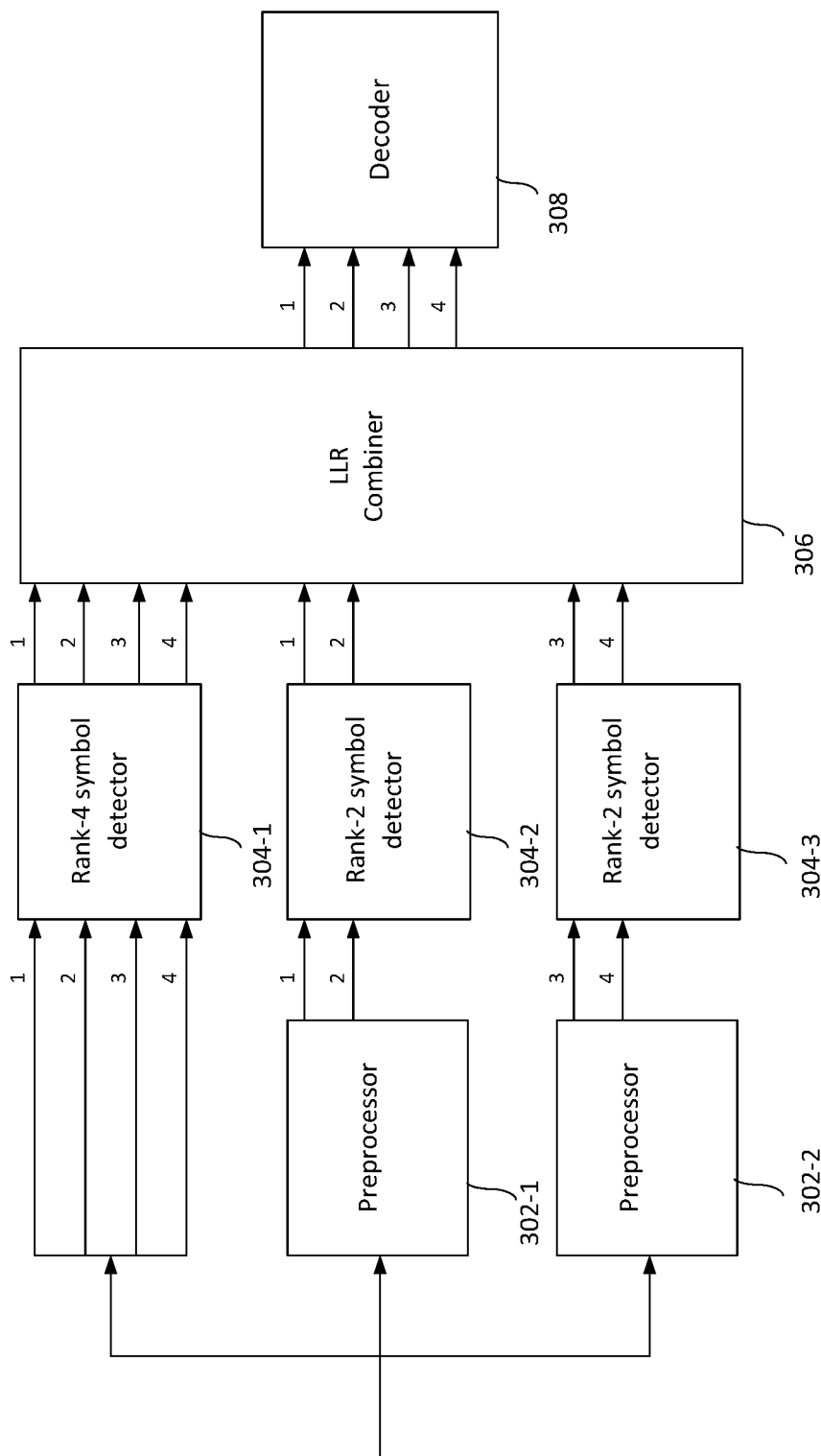
FIG. 3 is a diagram illustrating a rank-4 symbol detector implemented with one rank-4 symbol detector and two rank-2 symbol detectors, according to one embodiment.

FIG. 3 is a diagram illustrating a rank-4 symbol detector implemented with one rank-4 symbol detector and two rank-2 symbol detectors, according to one embodiment.

Using IW as a preprocessing scheme, multiple virtual channels are generated. At first preprocessor 302-1, IW is performed on layers [3, 4] of the channel, resulting in detection layers [1, 2]. At second preprocessor 302-2, IW is performed on layers [1, 2] of the channel, resulting in detection layers [3, 4]. Layers [1, 2, 3, 4] of the channel are directly fed to rank-4 symbol detector 304-1 without preprocessing.

Symbol detection is performed on detection layers [1, 2, 3, 4] at the rank-4 symbol detector 304-1. Symbol detection is performed on detection layers [1, 2] at first rank-2 symbol detector 304-2. Symbol detection is performed on detection layers [3, 4] at second rank-2 symbol detector 304-3. Symbol detectors 304-1, 304-2, and 304-3 generate LLR values (or ED values) for the layers (e.g., [1, 2, 3, 4], [1, 2], and [3, 4]).

The LLR values (or ED values) are combined at a combiner 306 using an LLR combining scheme (or an ED combining scheme), and the resulting final LLR values are fed from the combiner 306 to a decoder 308 to provide a decoded symbol value of the received signal.

Figure 4:
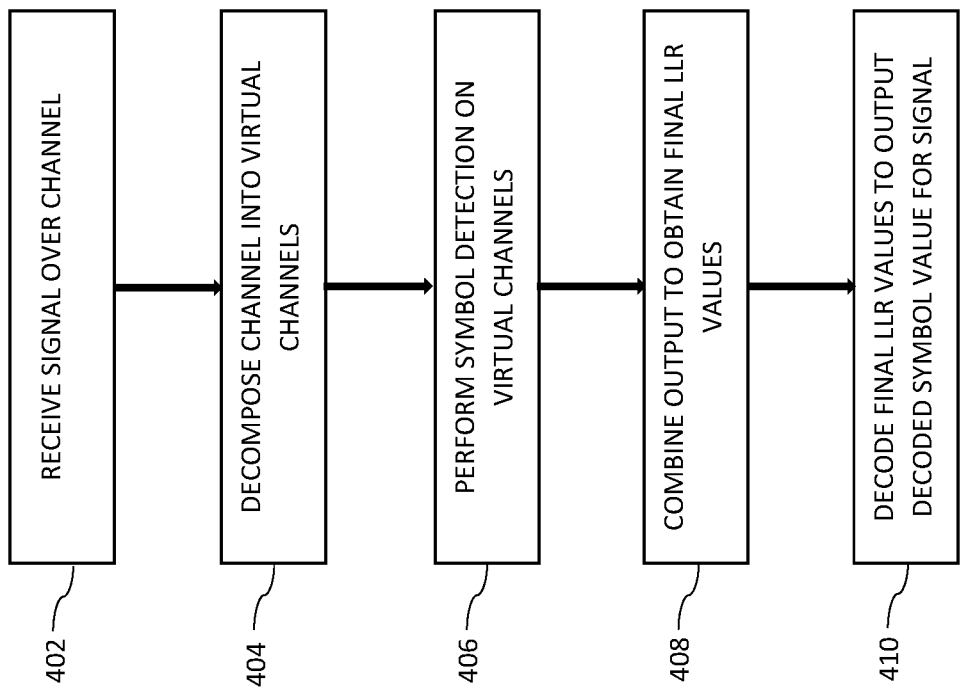
FIG. 4 is a flow chart illustrating a method for high rank symbol detection, according to one embodiment.

FIG. 4 is a flow chart illustrating a method for high-rank symbol detection, according to one embodiment.

A modem of an electronic device receives a signal over a channel at 402. Preprocessors decompose the channel into virtual channels via a signal preprocessing scheme at 404. At least one of the virtual channels has a rank lower than that of the channel over which the signal is received. Additionally, different combinations of layers of the channel are preprocessed for each of the virtual channels. Respective symbol detectors perform symbol detection on each of the virtual channels at 406. At least one symbol detector has a rank that is lower than that of the channel over which the signal is received. The output from each symbol detector includes LLR values or ED values for the corresponding layers processed at each symbol detector. A combiner combines output from the plurality of symbol detectors to obtain final LLR values for layers of the channel over which the signal is received at 408. A decoder performs decoding using the final LLR values to output a decoded symbol value for the signal received over the channel at 410.

According to one embodiment, the present apparatus includes a high-rank multiple-input, multiple output (MIMO) symbol detector configured to detect symbols of a signal received over a channel. The high-rank MIMO symbol detector includes one or more preprocessors each configured to decompose the N-rank channel into several virtual channels. Each virtual channel may have a rank less than N. Preprocessing may be performed by whitening one or more layers of the N-rank channel, and outputting remaining un-whitened layers. The high-rank MIMO symbol detector also includes one or more lower-rank detectors configured to perform symbol detection of the remaining un-whitened layers for a virtual channel. The high-rank MIMO symbol detector also includes a combiner configured to combine an output of each lower-rank detector and output a combined result. The output of each lower-rank detector may be ED values or LLR values corresponding to layers of the channel over which the signal is received. The high-rank MIMO symbol detector further includes a decoder configured to output a decoded symbol value of the signal based on the combined result.

Figure 5:
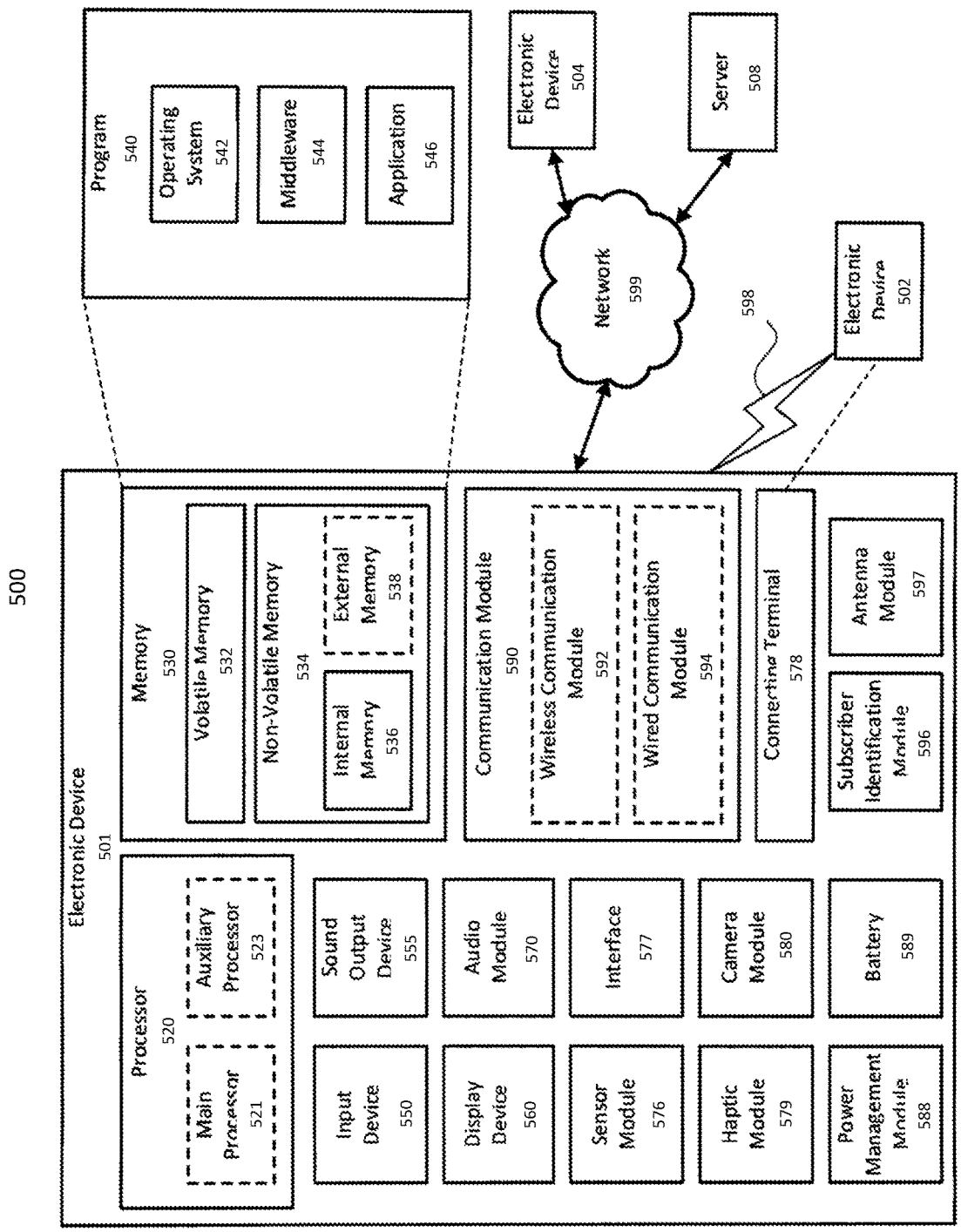
FIG. 5 is a diagram illustrating an electronic device in a network environment, according to one embodiment.

FIG. 5 is a block diagram of an electronic device in a network environment, according to one embodiment. Referring to FIG. 5, an electronic device 501 in a network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of operating an electronic device in a multiple-input multiple-output (MIMO) wireless communication system, the method comprising:
receiving a signal over a channel;
decomposing the channel into a plurality of virtual channels;
performing symbol detection on each of the plurality of virtual channels using respective symbol detectors, wherein at least one of the symbol detectors has a lower rank than that of the channel;
combining output from the symbol detectors to obtain final log likelihood ratio (LLR) values for layers of the channel; and
performing decoding using the final LLR values to output a decoded symbol value for the received signal.

2. The method of claim 1, wherein at least one of the plurality of virtual channels has a lower rank than that of the channel.

3. The method of claim 1, wherein, in decomposing the channel, a different combination of layers, from among the layers of the channel, is preprocessed for each of the plurality of virtual channels.

4. The method of claim 1, wherein each of the plurality of symbol detectors has a lower rank than that of the channel.

5. The method of claim 1, wherein the channel is a rank-8 channel and the symbol detectors comprise a plurality of rank-4 symbol detectors or a plurality of rank-2 symbol detectors.

6. The method of claim 1, wherein the channel is a rank-4 channel and the symbol detectors comprise a rank-4 symbol detector and a plurality of rank-2 symbol detectors.

7. The method of claim 1, wherein the symbol detectors comprise at least one of a maximum likelihood detector, zero-forcing (ZF) detector, minimum mean square error (MMSE) detector, ZF/MMSE-successive interference cancellation detector, and sphere decoder detector.

8. The method of claim 1, wherein the channel is decomposed via a signal preprocessing scheme comprising at least one of interference whitening, interference cancellation, interference ignorance, and block based interference whitening.

9. The method of claim 1, wherein the output from each of the symbol detectors comprises initial LLR values or Euclidean distance (ED) values for a respective combination of layers, from among the layers of the channel.

10. The method of claim 9, wherein, when the output comprises LLR values, the output is combined using LLR summation, LLR mean, or LLR selection.

11. The method of claim 9, wherein, when the output comprises ED values, the output is combined using ED combining.

12. An electronic device, comprising:
a processor; and
a non-transitory computer readable storage medium storing instructions that, when executed, cause the processor to:
receive a signal over a channel;
decompose the channel into a plurality of virtual channels;
perform symbol detection on each of the plurality of virtual channels using respective symbol detectors, wherein at least one of the symbol detectors has a lower rank than that of the channel;
combine output from the symbol detectors to obtain final log likelihood ratio (LLR) values for layers of the channel; and
perform decoding using the final LLR values to output a decoded symbol value of the received signal.

13. The electronic device of claim 12, wherein at least one of the plurality of virtual channels has a lower rank than that of the channel.

14. The electronic device of claim 12, wherein, in decomposing the channel, a different combination of layers, from among the layers of the channel, is preprocessed for each of the plurality of virtual channels.

15. The electronic device of claim 12, wherein each of the plurality of symbol detectors has a lower rank than that of the channel.

16. The electronic device of claim 12, wherein the channel is a rank-8 channel and the symbol detectors comprise a plurality of rank-4 symbol detectors or a plurality of rank-2 symbol detectors.

17. The electronic device of claim 12, wherein the channel is a rank-4 channel and the symbol detectors comprise a rank-4 symbol detector and a plurality of rank-2 symbol detectors.

18. The electronic device of claim 12, wherein the output from each of the symbol detectors comprises initial LLR values or Euclidean distance (ED) values for a respective combination of layers, from among the layers of the channel.

19. The electronic device of claim 18, wherein:
when the output comprises initial LLR values, the output is combined using LLR summation, LLR mean, or LLR selection; and
when the output comprises ED values, the output is combined using ED combining.

20. A multiple-input multiple-output symbol detector of an electronic device comprising:
one or more preprocessors configured to decompose a channel, over which a signal is received, into a plurality of virtual channels;
a plurality of symbol detectors configured to perform symbol detection on each of the plurality of virtual channels, wherein at least one of the plurality of symbol detectors has a lower rank than that of the channel;
a combiner configured to combine output from the symbol detectors to obtain final log likelihood ratio (LLR) values for layers of the channel; and
a decoder configured to decode the final LLR values and output a decoded symbol value of the received signal.

* * * * *